(12) United States Patent
Bouchet

(10) Patent No.: US 7,283,895 B2
(45) Date of Patent: Oct. 16, 2007

(54) METHOD AND DEVICE FOR CALCULATING A TARGET SPEED FOR AN AIRCRAFT

(75) Inventor: Christophe Bouchet, Toulouse (FR)

(73) Assignee: Airbus France, Toulouse (FR)

( * ) Notice: Subject to any disclaimer, the term of this patent is extended or adjusted under 35 U.S.C. 154(b) by 347 days.

(21) Appl. No.: 11/047,654

(22) Filed: Feb. 2, 2005

(65) Prior Publication Data
US 2005/0216140 A1 Sep. 29, 2005

(30) Foreign Application Priority Data
Feb. 16, 2004 (FR) ................... 04 01516

(51) Int. Cl.
*B64C 1/00* (2006.01)
(52) U.S. Cl. .......................................................... 701/3
(58) Field of Classification Search ..................... 701/3
See application file for complete search history.

(56) References Cited

U.S. PATENT DOCUMENTS 5,051,910 A * 9/1991 Liden ........................ 701/204
5,121,325 A 6/1992 DeJonge
6,061,612 A 5/2000 Sainthuile et al.
6,507,782 B1 1/2003 Rumbo et al.

FOREIGN PATENT DOCUMENTS

FR 2749933 12/1997

OTHER PUBLICATIONS

Preliminary Search Report dated Oct. 5, 2004, with English translation.

* cited by examiner

*Primary Examiner*—Thu V. Nguyen
(74) *Attorney, Agent, or Firm*—Stevens, Davis, Miller, Mosher, LLP

(57) ABSTRACT

A method and device for calculating a target speed of an aircraft may include a flight point time determining section that determines when the aircraft actually gets to a particular flight point, taking account of the aircraft's current target speed. A time interval calculating section calculates a time interval between the predetermined time at which the aircraft must get to the particular flight point and the determined actual time. A speed updating section updates the target speed and applies the updated target speed to the aircraft if the calculated time interval is greater than a duration of comparison, which is variable and depends on the actual distance so as to decrease when the actual distance decreases.

12 Claims, 5 Drawing Sheets

METHOD AND DEVICE FOR CALCULATING A TARGET SPEED FOR AN AIRCRAFT

FIELD OF THE INVENTION

The present invention relates to a method and a device for calculating at least one target speed for an aircraft, in particular a military transport plane, which is guided at said target speed along a flight plan exhibiting at least one time constraint.

BACKGROUND OF THE RELATED ART

Within the framework of the present invention, the expression time constraint is understood to mean a constraint which obliges the aircraft to get to a particular flight point at a predetermined time.

Generally, to carry out such a method, the succession of following steps is implemented repeatedly:

a) the actual time at which the aircraft gets to said particular flight point is determined, taking account of the current target speed;
b) a time interval corresponding to the difference between said predetermined time and said actual time is calculated;
c) this time interval is compared with a duration of comparison; and
d) said target speed is updated, which is applied to the aircraft, as soon as said actual time interval becomes greater than said duration of comparison.

Such a standard method of calculation (and of updating) of the target speed generally entails a quasi-permanent updating of said target speed, in particular by virtue of incessant variations of internal and external (to the aircraft) parameters, which are used in a standard manner for this calculation, such as the characteristics of the wind in particular. This is all the more true as the duration of comparison is generally reduced and most often corresponds to a few seconds of flight.

This known method therefore requires an appreciable calculation ability and especially entails a permanent fluctuation of the target speed, this being very penalizing, since:

on the one hand, this fluctuation entails a drop in comfort of the passengers of the aircraft, which is flown at said target speed; and
on the other hand, any fluctuation gives rise to the need to update other prediction parameters which depend on said target speed.

SUMMARY OF THE INVENTION

An object of the present invention is to remedy these drawbacks. It relates to a method of calculating (and of updating) at least one target speed for an aircraft which is guided at said target speed along a flight plan exhibiting at least one time constraint which constrains the aircraft to get to a particular flight point at a predetermined time, which method makes it possible to considerably reduce the number of updates of the target speed.

For this purpose, according to the invention, said method according to which:

a) the actual time at which the aircraft gets to said particular flight point is determined, taking account of the current target speed;
b) a time interval corresponding to the difference between said predetermined time and said actual time is calculated;
c) this time interval is compared with a duration of comparison; and
d) said target speed is updated, which is applied to the aircraft, if said time interval is greater than said duration of comparison, is noteworthy in that the actual distance between the current position of the aircraft and said particular flight point is determined, and in that said duration of comparison is variable and depends on said actual distance in such a way as to decrease at least in part when said actual distance decreases.

Thus, by virtue of the variation of the duration of comparison, as a function of the actual distance, the number of updates of the target speed is reduced. Moreover, updating is carried out only when it is actually necessary. Specifically, when the aircraft is far from the particular flight point subject to said time constraint, provision is made for a bigger comparison distance (in general several tens of seconds), which has the consequence of relaxing the limit which triggers the updating of said target speed and therefore reduces the number of updates. On the other hand, when the aircraft is approaching said particular flight point, the limit which triggers the update is tightened (in general to a few seconds, as in the aforesaid standard method) in such a way as to carry out all the necessary updates, so that the aircraft does indeed reach said particular flight point at said predetermined time (doing so to within a very small margin).

Advantageously, when said actual distance:

is greater than a first distance, said duration of comparison exhibits a first constant value;
is less than a second distance which is less than said first distance, said duration of comparison exhibits a second constant value which is less than said first constant value; and
lies between said first and second distances, said duration of comparison varies progressively from said first constant value to said second constant value.

In this case, advantageously:

said second distance corresponds to the distance traveled by the aircraft over a predetermined duration at maximum speed; and/or
when said actual distance lies between said first distance and a third distance which is greater than said first distance, said duration of comparison corresponds to said first value and when said actual distance is greater than said third distance, said target speed is not updated.

In a preferred embodiment, said duration of comparison varies as a function of said actual distance:

along a first convergence curve, when the aircraft has to decelerate; and
along a second convergence curve, when the aircraft has to accelerate, said first and second convergence curves forming a cone of convergence.

Preferably, said cone of convergence is asymmetric, that is to say exhibits at least in part different values depending on whether the aircraft is late or early with respect to the time constraint. This characteristic makes it possible to take account of the different abilities of the aircraft to accelerate and to decelerate, respectively.

Advantageously, at least one of the parameters defining said cone of convergence depends at least on one of the following characteristics:

the ability of the aircraft to accelerate;
the ability of the aircraft to decelerate; and
the type of said flight plan (for example a flight plan for a flight at low altitude).

Moreover, according to the invention, in step d), after an updating of the target speed, at least one prediction parameter (such as the quantity of fuel available for example), is also updated using said target speed thus updated.

The present invention also relates to a device for calculating at least one target speed for an aircraft which is guided at said target speed along a flight plan exhibiting at least one time constraint which constrains the aircraft to get to a particular flight point at a predetermined flight time.

According to the invention, said device of the type comprising:
- first means for determining the actual time at which the aircraft gets to said particular flight point, taking account of the current target speed;
- second means for calculating a time interval corresponding to the difference between said predetermined time and said actual time;
- third means for comparing this time interval with a duration of comparison; and
- fourth means for updating said target speed, which is applied to the aircraft, if said time interval is greater than said duration of comparison, is noteworthy in that it moreover comprises:
- fifth means for determining the actual distance between the current position of the aircraft and said particular flight point; and
- sixth means connected to said third means, for determining said duration of comparison which is variable and which depends on said actual distance in such a way as to decrease at least in part when said actual distance decreases.

Additionally, advantageously:
- said device moreover comprises seventh means for updating at least one prediction parameter, using an updated target speed; and/or
- said fourth means provide for the keeping of the aircraft slightly early, so as to maintain a margin for the calculation.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
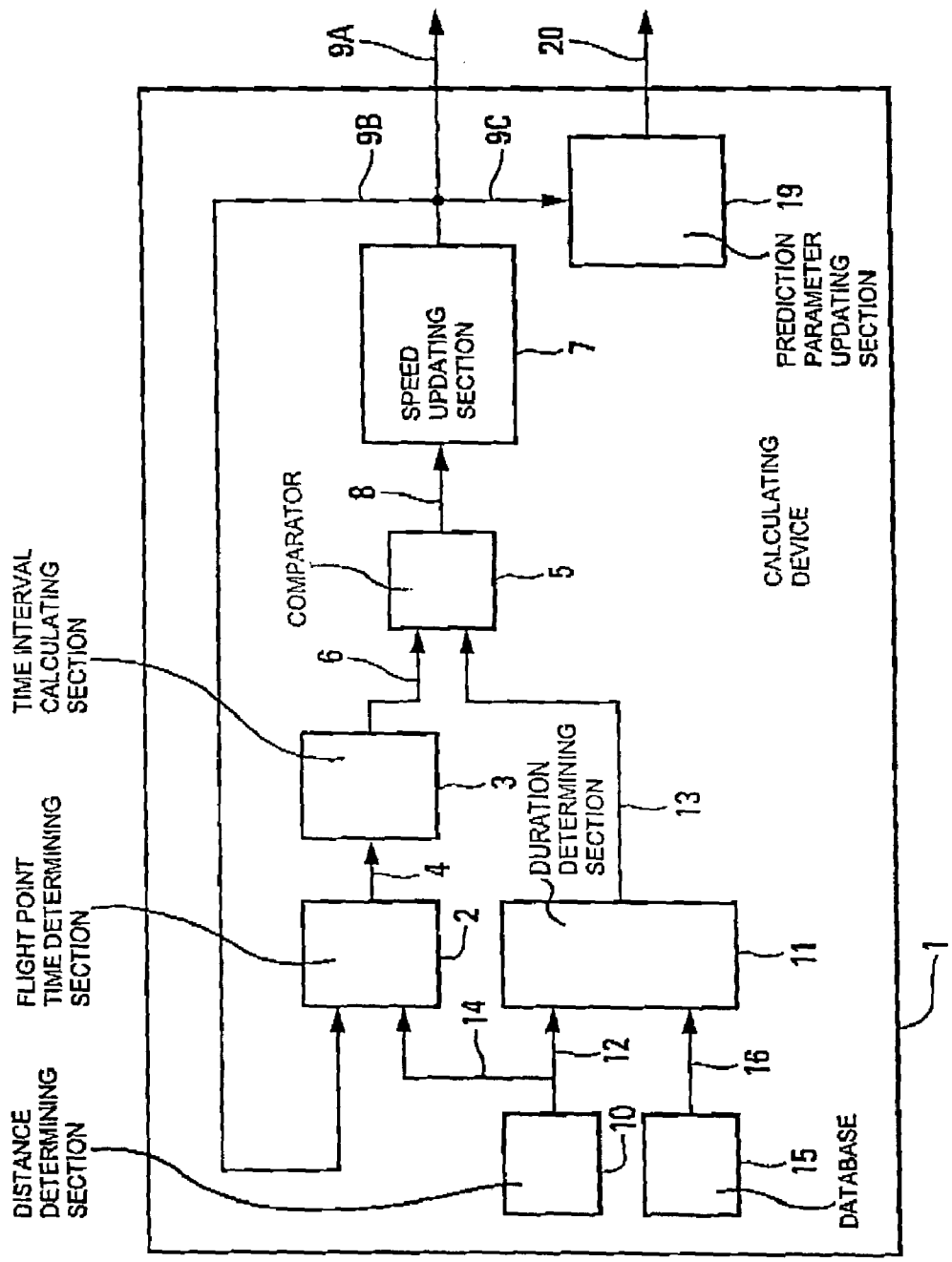
FIG. 1 is the schematic diagram of a device in accordance with the invention.

The device 1 in accordance with the invention and represented diagrammatically in FIG. 1 is intended to calculate at least one target speed VC for an aircraft A, in particular a military transport plane, which is guided at said target speed VC along a flight plan exhibiting at least one time constraint which constrains said aircraft A to get to a particular flight point P0 at a predetermined time T0.

Said calculation device 1 which is, for example, integrated into (or associated with) a flight management system of FMS type on board the aircraft A, comprises in standard fashion:
- means 2 for determining the actual time Teff at which the aircraft A gets to said particular flight point P0, taking account of the current target speed VC;
- means 3 which are connected by a link 4 to said means 2, for calculating a time interval Δt corresponding to the difference between said predetermined time T0 and said actual time Teff and such that Δt=T0−Teff. Thus, when Δt is positive (that is to say when T0 is greater than Teff), the aircraft A is early with respect to said predetermined time T0 (since under the current conditions it gets to the particular point P0 at a time Teff which is less than said time T0) so that said aircraft A must then decelerate to be able to comply with said time constraint. On the other hand, when Δt is negative (and T0 is less than Teff), the aircraft A is late and has to accelerate if it wants to comply with the time constraint;
- means 5 which are connected by a link 6 to said means 4, for comparing this time interval Δt with a duration of comparison DC;
- means 7 which are connected by a link 8 to said means 5, for updating in standard fashion said target speed VC which is applied to the aircraft A, if said actual time interval Δt is greater than said duration of comparison DC. Said means 7 can transmit the target speed VC thus updated, with the aid of a link 9A, to user devices (not represented).

According to the invention, said device 1 moreover comprises:
- means 10 for determining the actual distance deff between the current position P1 of the aircraft A and said particular flight point P0; and
- means 11 which are connected by a link 12 to said means 10, for determining (according to a particular manner in accordance with the invention) said duration of comparison DC and for transmitting it by a link 13 to said means 5. More precisely, according to the invention, said duration of comparison DC is variable and depends on said actual distance deff in such a way as to decrease at least in part when said actual distance deff decreases, as specified hereinbelow.

By virtue of the calculation of the duration of comparison DC and of its variation as a function of the actual distance deff, as specified hereinbelow, the number of updates of the target speed VC is reduced.

Moreover, the update is carried out only when it is actually necessary.

Specifically, when the aircraft A is far from said particular flight point P0 subject to said time constraint, said comparison distance DC is bigger, this having the consequence of relaxing the limit which triggers the update. On the other hand, when the aircraft A is approaching said particular flight point P0, said limit which triggers the update is tightened in such a way as to be able to carry out all the necessary updates.

Moreover, said means 2 determine the actual time Teff at which the aircraft A gets to said particular flight point P0, with the aid of the target speed VC calculated or updated previously and received from said means 7 via a link 9B, and with the aid of said actual distance deff between the current position P1 of the aircraft A and said particular flight point P0, received from said means 10 via a link 14.

Furthermore, said means 11 determine the duration of comparison which is used by the means of comparison 5, on the basis of a chart:
- which is represented in FIGS. 2 to 5;
- which is predetermined;
- which comprises convergence curves C1 and C2 indicating values of duration of comparison DC as a function of values of actual distance deff; and which is recorded in a database 15 connected by a link 16 to said means 11, as well as on the basis of said actual distance deff received from said means 10.

Figure 2:
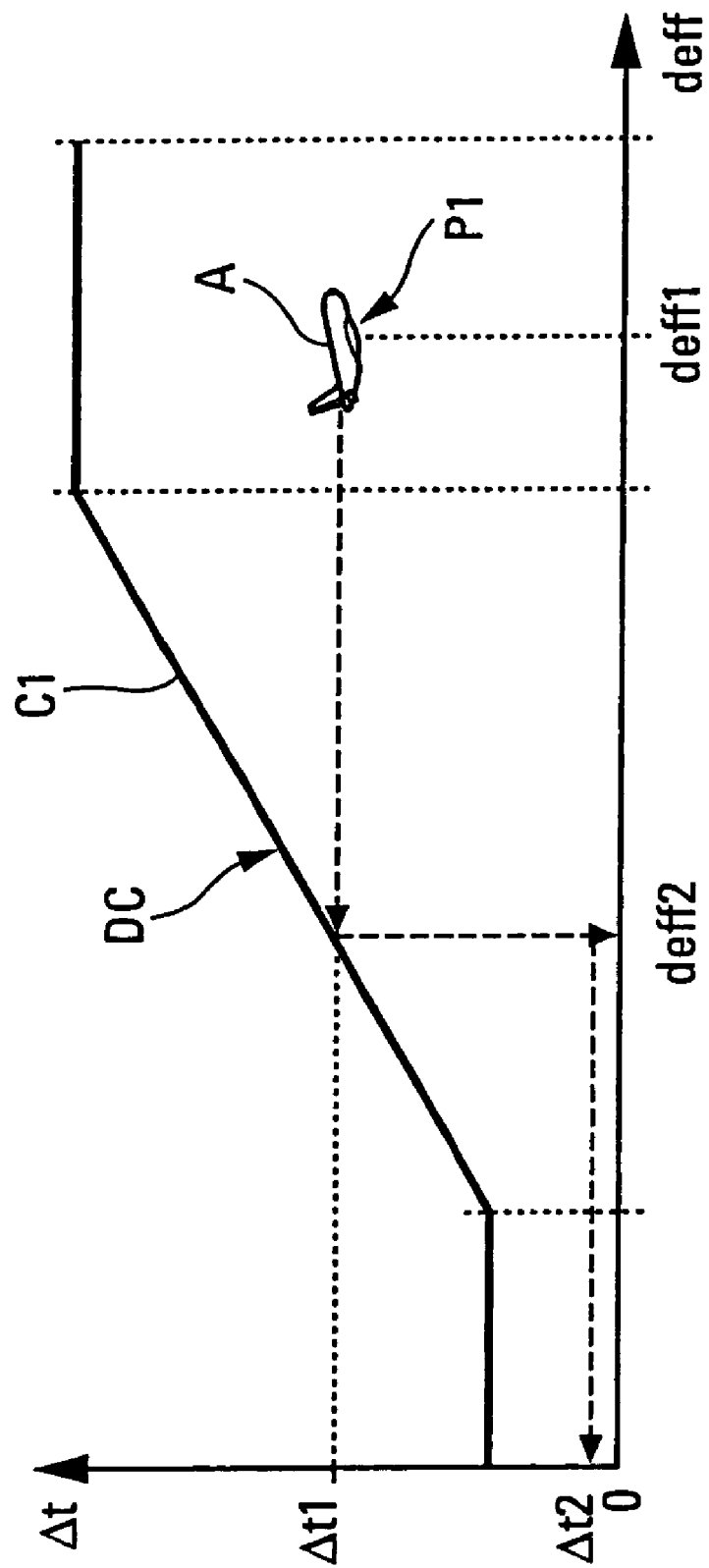
FIGS. 2 to 5 are graphs showing convergence curves for a full explanation of the present invention.

As may be seen in FIG. 2, at an actual distance deff1 from said particular flight point P0, the time interval Δt1 is less than the duration of comparison DC (so that no update of the target speed VC is necessary), this being so up to an actual distance deff2, at which such an update must be carried out, otherwise said time interval Δt1 would become greater than said duration of comparison DC. Following this update, a time interval Δt2 which requires no further update until said particular flight point P0 (where deff is zero) is obtained.

Figure 3:
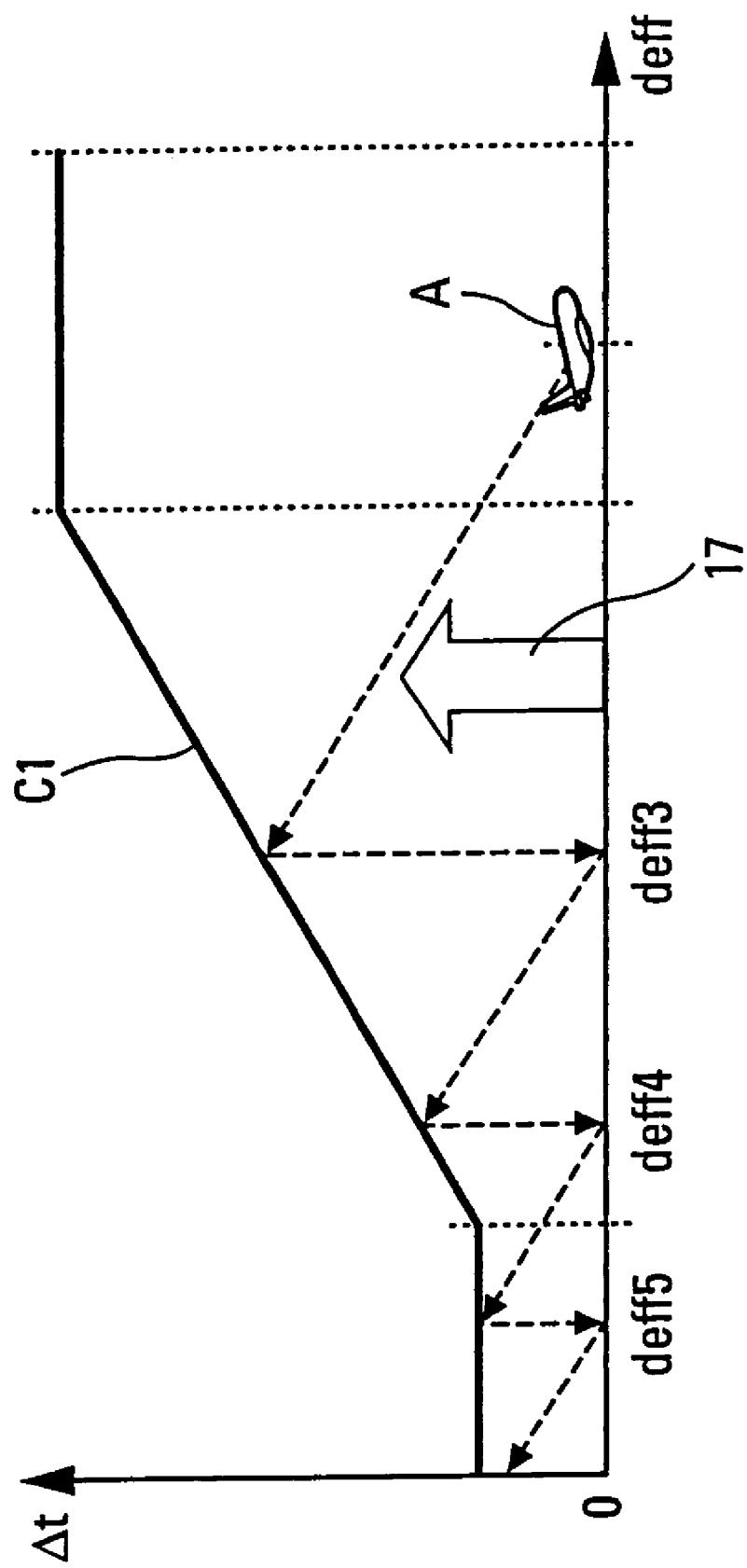

FIG. 3 illustrates a situation similar to that of FIG. 2, with permanent and very strong gusts of wind, depicted by an arrow 17 and whose effect is to make the time interval Δt rapidly increase so that successive updates are necessary at distances deff3, deff4 and deff5, up to said particular point P0.

Figure 4:
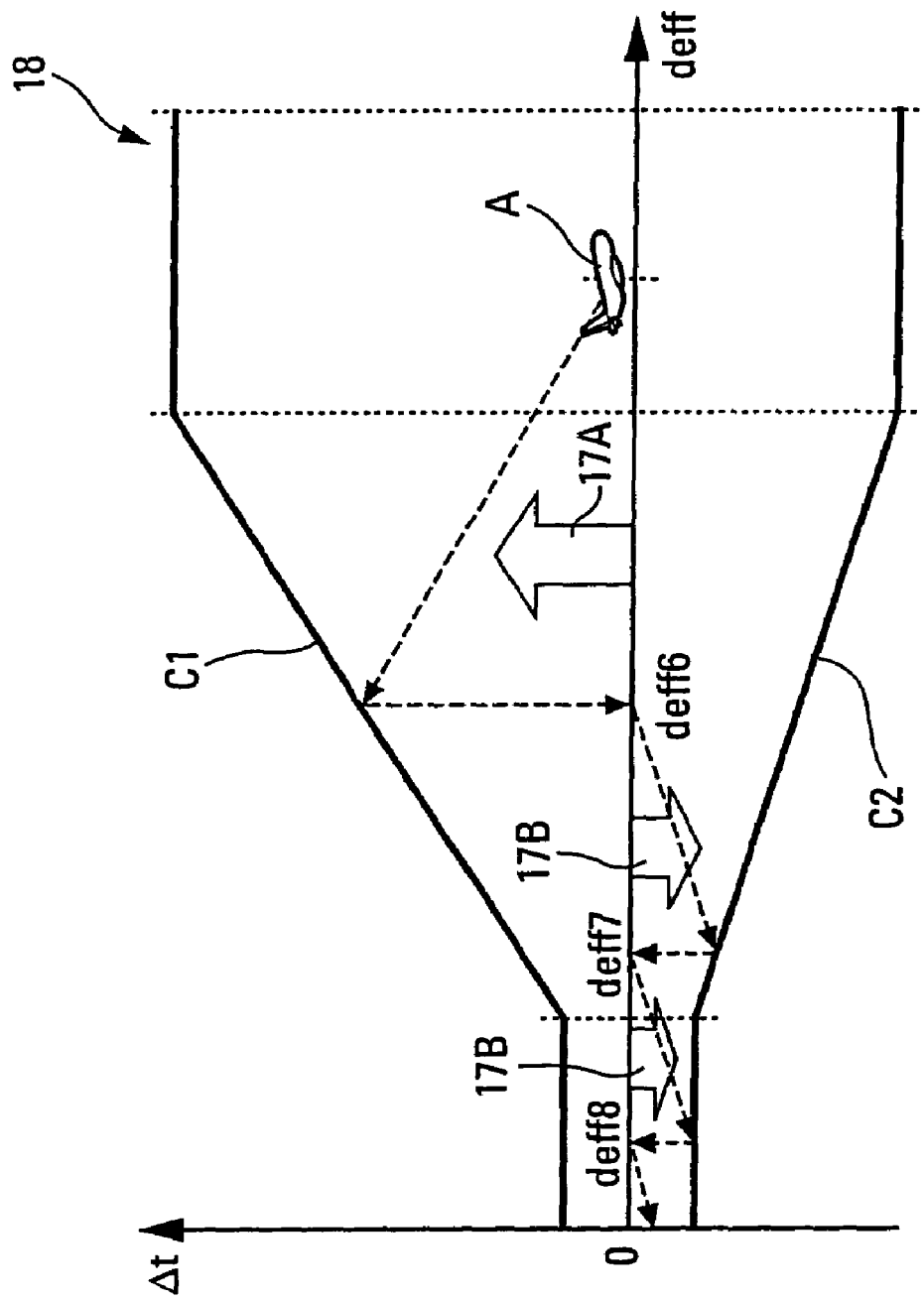

Of course, the wind gusts may have the consequence that the aircraft A is either early, or late, with respect to the time constraint. This is why provision is made for two convergence curves C1 and C2, as represented in FIG. 4. The convergence curve C1 corresponds to the case where the aircraft A has to decelerate and the convergence curve C2 corresponds to the case where the aircraft A has to accelerate, so as to comply with said time constraint. They therefore correspond to different signs of the time interval Δt (positive sign for the convergence curve C1, negative sign for the convergence curve C2).

The two convergence curves C1 and C2 form a cone of convergence 18.

Thus, as may be seen in FIG. 4:
first gusts of wind 17A may entail an updating of the target speed VC at a distance deff 6, such that the aircraft A has to decelerate; and
second gusts of wind 17B may entail updates of the target speed VC at distances deff7 and deff8, such that the aircraft A has to accelerate.

In a preferred embodiment, said cone of convergence 18 is such that when said actual distance deff:
is greater than a first distance d1, said duration of comparison DC exhibits a first constant value DC1A, DC1B;
is less than a second distance d2 which is less than said first distance d1, said duration of comparison DC exhibits a second constant value DC2A, DC2B; and
lies between said first distance d1 and said second distance d2, said duration of comparison DC varies progressively from said first constant value DC1A, DC1B to said second constant value DC2A, DC2B. The discrepancy between d1 and d2 is preferably appreciable, so as to avoid overly abrupt changes of the limits of comparison.

Said second distance d2 preferably corresponds to the distance traveled by the aircraft A over a predetermined duration, for example 2 minutes, at maximum speed. This second distance d2 defines the limit, onwards of which the time constraint must be fully complied with by the aircraft A.

Furthermore, in a particular embodiment, when said actual distance deff lies between said first distance d1 and a third distance d3 which is greater than said first distance d1, said duration of comparison corresponds to said first value DC1A, DC1B, and, when said actual distance deff is greater than said third distance d3, the device 1 does not update said target speed VC since the aircraft A is still too far from the particular flight point P0.

By way of illustration, for example when the flight plan comprises a flight trajectory at low altitude, the following values can be used:
d1=150 NM (nautical mile), around 278 km (kilometers);
d2=10 NM, around 18 km;
d3=200, around 370 km;
DC2A=5 seconds; and
DC2B=5 seconds.

Figure 5:
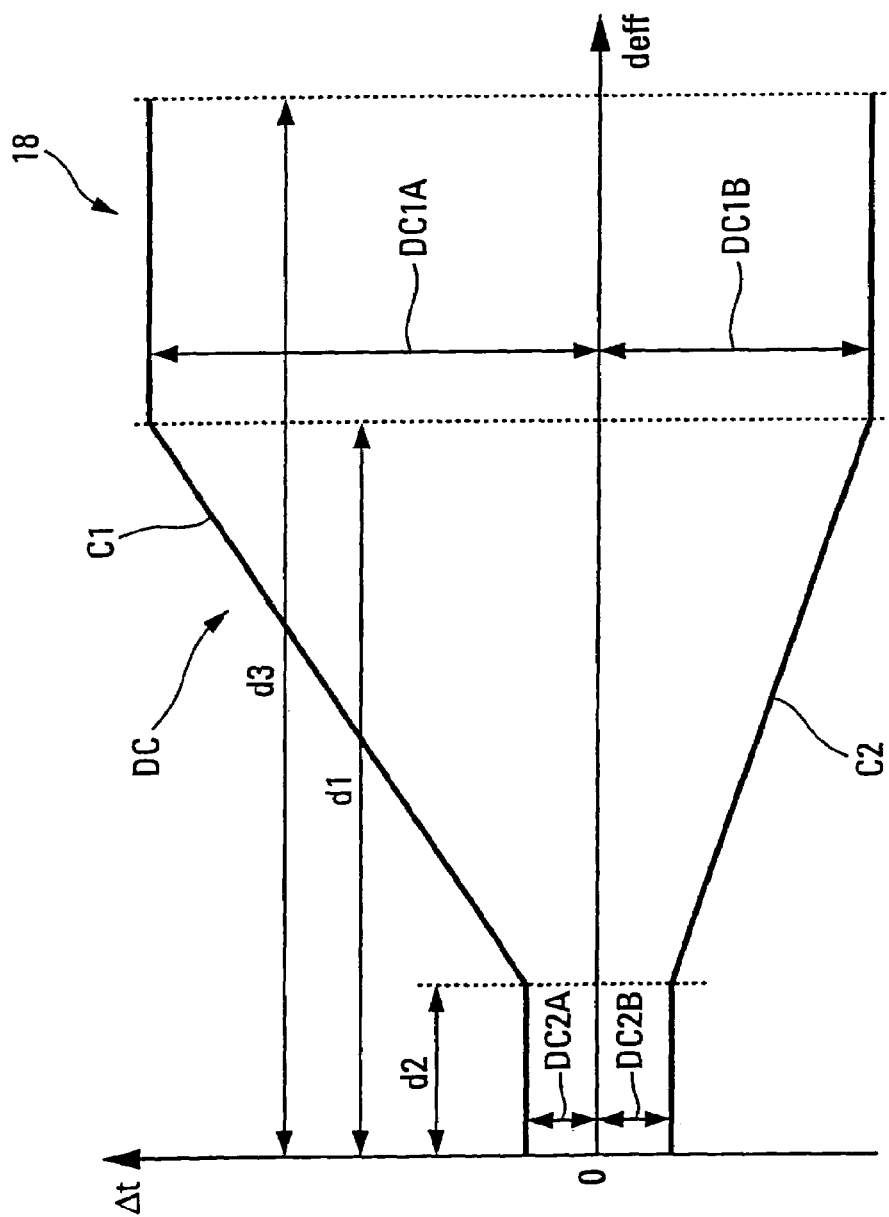

Moreover, in a preferred embodiment, said cone of convergence 18 is asymmetric, as represented in FIGS. 4 and 5, that is to say it takes account of different values depending on whether the aircraft A is late or early with respect to the time constraint. Thus, the first constant values DC1A and DC1B take different values, for example respectively 60 seconds and 30 seconds. This last characteristic makes it possible to take account of the different abilities of the aircraft A to accelerate (convergence curve C2) and to decelerate (convergence curve C1). An acceleration is of course more difficult to achieve and more expensive than a deceleration.

Additionally, at least one of the parameters defining said cone of convergence 18 depends at least on one of the following characteristics:
the ability of the aircraft A to accelerate;
the ability of the aircraft A to decelerate; and
the type of flight plan.

Additionally, the device 1 in accordance with the invention moreover comprises means 19 which are connected by a link 9C to said means 7, for updating at least one prediction parameter (such as the quantity of fuel available on board the aircraft A at said particular flight point P0), using the updated target speed VC.

The device 1 in accordance with the invention is particularly well suited to use on an aircraft A flying along a flight plan which exhibits at least one flight section at low altitude, since, in such a case, an update of the target speed VC entails on each occasion an update of the vertical trajectory of said flight section at low altitude, this requiring a high calculation ability and a high calculation time. Consequently, the reduction obtained by virtue of said device 1 in the number of updates is very beneficial in this application.

Preferably, in such an application, the aircraft A is kept slightly early so as to maintain a margin for the calculation, in case of updating of said target speed VC which entails an updating of the vertical trajectory. To do this, the following expression can be used:

VCcommand=VC theoretical+ΔVC, when the distance deff is greater than or equal to the distance d2, in which ΔVC represents a predetermined value which is dependent on the characteristics of the aircraft and which is chosen preferably in the interval [1 NM; 5 NM] (around [1.8 km; 9 km]).

The invention claimed is:

1. A method of calculating at least one target speed for an aircraft, which is guided at said target speed along a flight plan that exhibits at least one time constraint constraining the aircraft to get to a particular flight point at a predetermined time, according to which method:
   a) determining the actual time at which the aircraft gets to said particular flight point, taking account of the current target speed;
   b) calculating a time interval corresponding to the difference between said predetermined time and said actual time;
   c) comparing said time interval with a duration of comparison which is variable and which depends on the actual distance between the current position of the aircraft and said particular flight point in such a way that said duration of comparison decreases at least in part when said actual distance decreases; and d) updating said target speed and applying the updated target speed to the aircraft, if said time interval is greater than said duration of comparison, wherein said actual distance between the current position of the aircraft and said particular flight point is determined, and wherein said duration of comparison varies as a function of said actual distance:

along a first convergence curve, when the aircraft has to decelerate; and along a second convergence curve, when the aircraft has to accelerate, said first and second convergence curves being different and forming a cone of convergence which is asymmetric and which exhibits at least in part different values depending on whether the aircraft is late or early with respect to the time constraint, wherein:

the asymmetric cone takes account of the different abilities of the aircraft to accelerate and decelerate.

2. The method as claimed in claim 1, wherein, when said actual distance:

is greater than a first distance, said duration of comparison exhibits a first constant value;

is less than a second distance which is less than said first distance, said duration of comparison exhibits a second constant value which is less than said first constant value; and lies between said first and second distances, said duration of comparison varies progressively from said first constant value to said second constant value.

3. The method as claimed in claim 2, wherein said second distance corresponds to the distance traveled by the aircraft over a predetermined duration at maximum speed.

4. The method as claimed in claim 2, wherein, when said actual distance lies between said first distance and a third distance which is greater than said first distance, said duration of comparison corresponds to said first value, and wherein, when said actual distance is greater than said third distance, said target speed is not updated.

5. The method as claimed in claim 1, wherein at least one of the parameters defining said cone of convergence depends on the following characteristics:

the ability of the aircraft to accelerate;
the ability of the aircraft to decelerate; and
the type of said flight plan.

6. The method as claimed in claim 1, wherein in step d), after an updating of the target speed, at least one prediction parameter is updated using said target speed.

7. The method as claimed in claim 1, for an aircraft whose flight plan exhibits at least one flight section at low altitude, wherein in step d), after an updating of the target speed, the vertical trajectory of said flight section at low altitude is updated, and wherein the aircraft is kept slightly early so as to maintain a margin for the calculation.

8. A device for calculating at least one target speed for an aircraft, which is guided at said target speed along a flight plan that exhibits at least one time constraint constraining the aircraft to get to a particular flight point at a predetermined time, said device comprising:

a flight point time determining section that determines the actual time at which the aircraft gets to said particular flight point, taking account of the current target speed;

a time interval calculating section that calculates a time interval corresponding to the difference between said predetermined time and said actual time;

a comparator that compares said time interval with a duration of comparison which is variable; and a speed updating section that updates said target speed and applies the updated target speed to the aircraft, if said time interval is greater than said duration of comparison, which moreover comprises:

a distance determining section that determines the actual distance between the current position of the aircraft and said particular flight point; and a duration determining section, connected to said comparator, that determines said duration of comparison which depends on said actual distance in such a way that said duration of comparison decreases at least in part when said actual distance decreases and said duration of comparison varies along a cone of convergence which is asymmetric and which exhibits at least in part different values depending on whether the aircraft is late or early with respect to the time constraint, wherein:

the asymmetric cone takes account of the different abilities of the aircraft to accelerate and decelerate.

9. The device as claimed in claim 8, which moreover comprises a prediction parameter updating section that updates at least one prediction parameter, using an updated target speed.

10. The device as claimed in claim 8, wherein said speed updating section provides for the keeping of the aircraft slightly early, so as to maintain a margin for the calculation.

11. An aircraft, which comprises a device for calculating at least one target speed for an aircraft, which is guided at said target speed along a flight plan that exhibits at least one time constraint constraining the aircraft to get to a particular flight point at a predetermined time, said device comprising:

a flight point time determining section that determines the actual time at which the aircraft gets to said particular flight point, taking account of the current target speed;

a time interval calculating section that calculates a time interval corresponding to the difference between said predetermined time and said actual time;

a comparator that compares said time interval with a duration of comparison which is variable; and a speed updating section that updates said target speed and applies the updated target speed to the aircraft, if said time interval is greater than said duration of comparison, which moreover comprises:

a distance determining section that determines the actual distance between the current position of the aircraft and said particular flight point; and a duration determining section, connected to said comparator, that determines said duration of comparison which depends on said actual distance in such a way that said duration of comparison decreases at least in part when said actual distance decreases and said duration of comparison varies along a cone of convergence which is asymmetric and which exhibits at least in part different values depending on whether the aircraft is late or early with respect to the time constraint, wherein:

the asymmetric cone takes account of the different abilities of the aircraft to accelerate and decelerate.

12. An aircraft, which comprises a device able to implement a method of calculating at least one target speed for an aircraft, which is guided at said target speed along a flight plan that exhibits at least one time constraint constraining the aircraft to get to a particular flight point at a predetermined time, according to which method:

a) determining the actual time at which the aircraft gets to said particular flight point, taking account of the current target speed;
b) calculating a time interval corresponding to the difference between said predetermined time and said actual time;
c) comparing said time interval with a duration of comparison which is variable and which depends on the actual distance between the current position of the aircraft and said particular flight point in such a way that said duration of comparison decreases at least in part when said actual distance decreases; and
d) updating said target speed and applying the updated target speed to the aircraft, if said time interval is greater than said duration of comparison, wherein said actual distance between the current position of the aircraft and said particular flight point is determined, and wherein said duration of comparison varies as a function of said actual distance:

along a first convergence curve, when the aircraft has to decelerate; and along a second convergence curve, when the aircraft has to accelerate, said first and second convergence curves being different and forming a cone of convergence which is asymmetric and which exhibits at least in part different values depending on whether the aircraft is late or early with respect to the time constraint, wherein:

the asymmetric cone takes account of the different abilities of the aircraft to accelerate and decelerate.

* * * * *